US011291530B2

(12) United States Patent
Karmon

(10) Patent No.: US 11,291,530 B2
(45) Date of Patent: Apr. 5, 2022

(54) DENTAL IMPLANT

(71) Applicant: Ben Zion Karmon, Petach-Tikva (IL)

(72) Inventor: Ben Zion Karmon, Petach-Tikva (IL)

( * ) Notice: Subject to any disclaimer, the term of this patent is extended or adjusted under 35 U.S.C. 154(b) by 0 days.

(21) Appl. No.: 17/334,717

(22) Filed: May 29, 2021

(65) Prior Publication Data

US 2021/0282902 A1 Sep. 16, 2021

Related U.S. Application Data

(63) Continuation of application No. 13/504,953, filed on May 6, 2013, now Pat. No. 11,166,791, which is a continuation-in-part of application No. PCT/IL2010/000879, filed on Oct. 25, 2010.

(30) Foreign Application Priority Data

Nov. 3, 2009 (IL) .......................................... 201902

(51) Int. Cl.
*A61C 8/00* (2006.01)
(52) U.S. Cl.
CPC .......... *A61C 8/0024* (2013.01); *A61C 8/0022* (2013.01); *A61C 8/0025* (2013.01)
(58) Field of Classification Search
CPC ... A61C 8/0024; A61C 8/0022; A61C 8/0025; A61C 8/0018
USPC ...................... 433/171–176, 201.1
See application file for complete search history.

(56) References Cited

U.S. PATENT DOCUMENTS

| | | |
|---|---|---|
| 4,468,200 A | 8/1984 | Munch |
| 4,722,688 A | 2/1988 | Lonca |
| 4,975,059 A | 12/1990 | Sendex |
| 5,064,425 A | 11/1991 | Branemark |
| 5,269,685 A | 12/1993 | Jorneus |
| 5,571,017 A | 11/1996 | Niznick |
| 5,588,838 A | 12/1996 | Hansson |
| 5,725,581 A | 3/1998 | Branemark |
| 5,897,319 A | 4/1999 | Wagner |
| 5,967,783 A | 10/1999 | Ura |
| 6,039,568 A | 3/2000 | Hinds |
| 6,048,204 A | 4/2000 | Klardie |
| 6,053,733 A | 4/2000 | Aspichurta |

(Continued)

FOREIGN PATENT DOCUMENTS

| | | |
|---|---|---|
| DE | 10356920 A1 | 6/2005 |
| EP | 1882458 | 7/2006 |

(Continued)

OTHER PUBLICATIONS

Notice of deficiencies in Israeli patent application No. 254999 from Israeli Patent Office filed on Aug. 15, 2021.

(Continued)

*Primary Examiner* — Nicholas D Lucchesi
*Assistant Examiner* — Mirayda A Aponte

(57) ABSTRACT

A dental implant that facilitate insertion and can be used in all bone types. The implant includes a body having a coronal end, and an apical end opposite the coronal end. A tapered region may be adjacent the apical end. On the apical part one or more taps are provided so the tap is cutting when rotating clockwise and counter-clockwise. The implant can have at least one variable profile helical thread that extends along the tapered region. The implant can have also micro-threads below the main threads, a gradual compressing tapered core, a self drilling apical end and a narrow coronal region.

18 Claims, 5 Drawing Sheets

(56) References Cited

U.S. PATENT DOCUMENTS

| | | |
|---|---|---|
| 6,068,632 A | 5/2000 | Carchidi |
| 6,102,703 A | 8/2000 | Day |
| 6,196,842 B1 | 3/2001 | Jorneus |
| 6,217,333 B1 | 4/2001 | Ercoli |
| 6,220,860 B1 | 4/2001 | Hansson |
| 6,431,867 B1 | 8/2002 | Gittelson et al. |
| 6,843,653 B2 | 1/2005 | Carlton |
| 7,008,227 B2 | 3/2006 | Carmichael |
| 7,281,926 B2 | 10/2007 | Yakir |
| 7,597,557 B2 | 10/2009 | Fromovich et al. |
| 2001/0055744 A1 | 12/2001 | Ura |
| 2004/0033469 A1 | 2/2004 | Blacklock |
| 2004/0101807 A1 | 5/2004 | Porter |
| 2004/0121289 A1 | 6/2004 | Miller |
| 2004/0219488 A1 | 11/2004 | Choi |
| 2005/0089818 A1 | 4/2005 | Engman |
| 2005/0101961 A1 | 5/2005 | Huebner |
| 2006/0172258 A1 | 8/2006 | Niznick |
| 2006/0223030 A1 | 10/2006 | Dinkekacker |
| 2007/0037123 A1 | 2/2007 | Mansueto |
| 2007/0160956 A1 | 7/2007 | Levisman |
| 2007/0298379 A1 | 12/2007 | D'Alise |
| 2008/0261175 A1 | 10/2008 | Hurson |
| 2009/0024174 A1 | 1/2009 | Stark |
| 2009/0048633 A1 | 2/2009 | Eom |
| 2009/0092944 A1 | 4/2009 | Pirker |
| 2009/0155744 A1 | 6/2009 | Jandali |
| 2009/0233256 A1 | 9/2009 | Schroering |
| 2009/0239195 A1 | 9/2009 | Wohrle et al. |
| 2010/0203477 A1 | 8/2010 | Crudo |
| 2013/0045462 A1 | 2/2013 | Tzeng |
| 2014/0045144 A1 | 2/2014 | Dukhan |
| 2014/0141388 A1 | 5/2014 | Dukhan |

FOREIGN PATENT DOCUMENTS

| | | |
|---|---|---|
| WO | WO 2003/028579 A1 | 4/2003 |
| WO | WO 2003/073956 A1 | 9/2003 |
| WO | WO 2004/103202 | 12/2004 |
| WO | WO 2005/065571 | 7/2005 |
| WO | WO 2006108951 A1 | 10/2006 |
| WO | WO 2008/125097 A1 | 10/2008 |
| WO | WO 2008/157137 | 12/2008 |
| WO | WO 2008/157138 | 12/2008 |
| WO | WO 2010/010558 | 1/2010 |
| WO | WO 2010/072211 | 7/2010 |
| WO | WO 2010106251 A1 | 9/2010 |

OTHER PUBLICATIONS

Translation to English of Notice of deficiencies in Israeli patent application No. 254999 from Israeli Patent Office filed on Aug. 15, 2021.

Notice of deficiencies in Israeli patent application No. 239268 from Israeli Patent Office filed on Apr. 19, 2020.

Translation to English of Notice of deficiencies in Israeli patent application No. 239268 from Israeli Patent Office filed on Apr. 19, 2020.

Notice of deficiencies in Israeli patent application No. 254999 from Israeli Patent Office filed on Jul. 2, 2020.

Translation to English of Notice of deficiencies in Israeli patent application No. 254999 from Israeli Patent Office filed on Jul. 2, 2020.

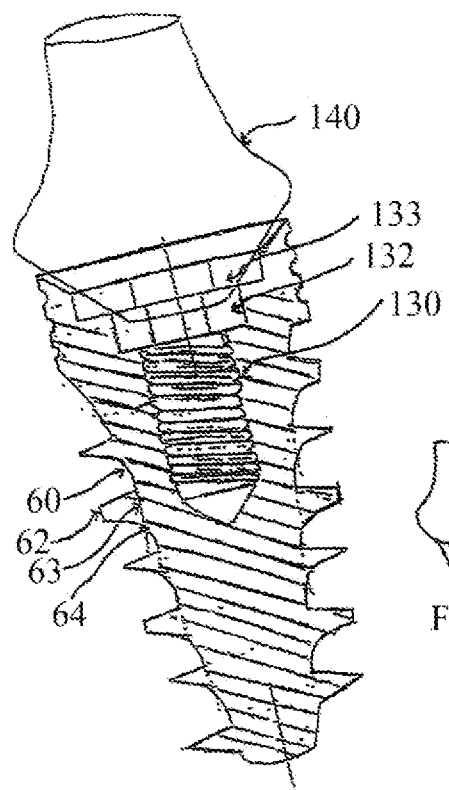 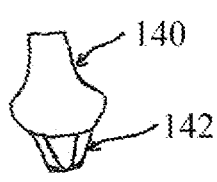 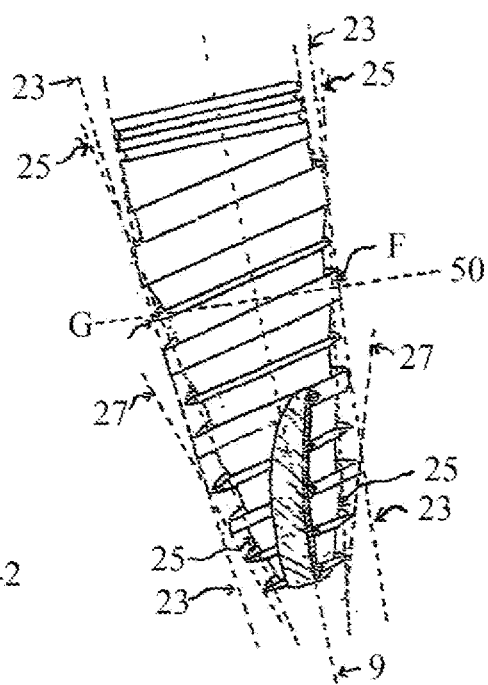
FIG. 6    FIG. 6A    FIG. 5
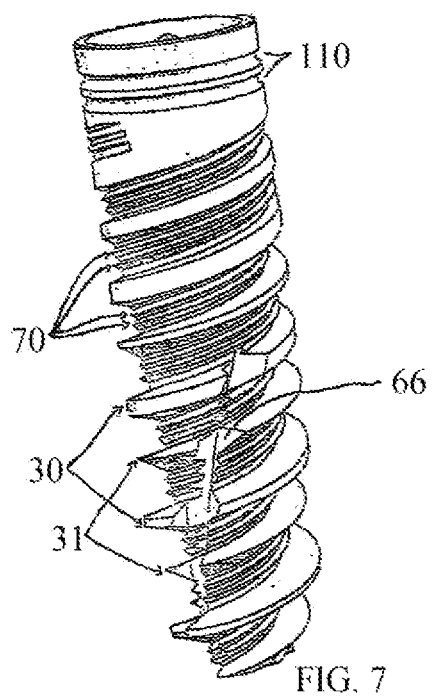 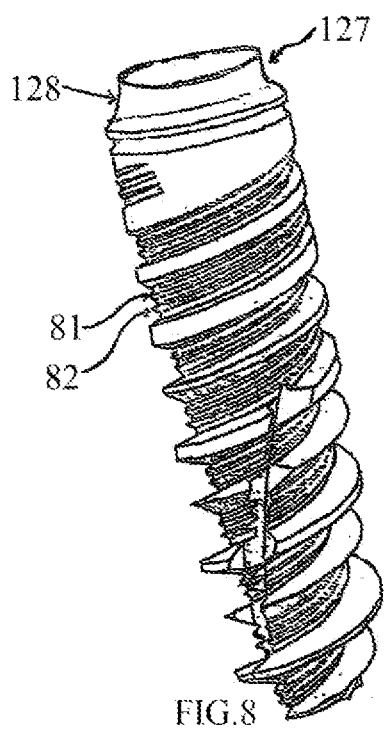
FIG. 7    FIG. 8

DENTAL IMPLANT

FIELD AND BACKGROUND OF THE INVENTION

The disclosures herein relate generally to bone anchorage implants and more particularly to a screw form dental implant having a combination of features designed to produce bone condensation while insertion is easy.

Many current screw-form dental implants are well designed for use in dense bone. The osseous anatomy of the human jaw is complex. While the density of the bone in the anterior regions of the mandible and maxilla is high, the posterior regions, particularly in the maxilla, are of significantly lower density. The height of the bony ridge in the posterior maxilla can be greatly reduced in partially or totally edentulous patients. This can lead to the need for use of shorter dental implants or grafting procedures in order to increase the height of bone available for implant placement.

Dental implant stability in low-density bone, such as that found in the posterior regions of the mandible and maxilla or/and in regenerated bone, can be difficult to achieve. Compaction of low density bone, such as by the use of osteotomes, is commonly performed in order to enhance the stability of implants at the time of surgical placement.

Implants of various tapers and with various thread profiles are known in the art in order to induce bone compression at the coronal aspect of the implant, i.e. at its widest end. The compression of the bone leads to increased stability of the implant.

As an implant is designed to be more condensing its insertion becomes more difficult. It is also more difficult to control the position of the implant since a condensing implant has a stronger tendency to slip into a region with the lowest bone density.

Most of the dental-implant manufactures have several types of implants. They sell implants for soft bone, implants for regular bone and implants for dense bone. Therefore these companies and the dentists need to have large stocks of implants and to learn how and when to use each type of implant.

Therefore, what is needed is an implant that can be suitable for all bone types. An implant that enhances stability in low density bone such as that found in the posterior mandible and the posterior maxilla but is easily inserted and can be used also in regular bone and in dense bone. Another advantage for this implant can be that the implant will keep its path of insertion and will not slip towards regions with low bone density.

SUMMARY OF THE INVENTION

This invention describes a skeletal screw that can be used in soft bone or/and dense bone. The following description will focus on dental implants but all the details can be implemented also in orthopedics for other regions of the body. Some embodiments, accordingly, provide a dental implant that is particularly suited for use in lower density bone but can be used also in high density bone. In one preferred embodiment a dental implant having at least one variable profile thread, the implant includes a body having a coronal end and an apical end. The body includes a tapered core adjacent the apical end. In some embodiments the core is not forming a straight line in cross section. One option is that the core is like a circular osteotome so the difference between the diameter of the core just coronally to a thread and the diameter of the core just apically to this thread is smaller compared to a regular tapered implant with the same angle of tapering. The implant can also include a variable width helical thread that extends along the tapered core. The thread has an apical side, a coronal side, a lateral edge and a base touching the core of the implant. A height defined between the lateral edge and the base touching the core. The width is defined by the length of the lateral edge. In one preferred embodiment the variable width is expanded in the direction of the coronal end. As a result, the least width of the thread is adjacent the apical end and the greatest width of the thread is adjacent the coronal end. The variable height is expanded in the direction of the apical end. As a result, the least height of the thread is adjacent the coronal end and the greatest height of the thread is adjacent the apical end. The implant can have more than one thread running along the implant. For example in one embodiment of the novel implant one thread can be suitable for dense bone and a second thread can be suitable for soft bone. The implant can have two cones one for the outer surface of the threads and the second for the inner surface of the threads meaning the core. In a preferred embodiment the angle of the first cone is smaller than the angle of the second cone. The implant can have more than two cones. In a preferred embodiment the novel implant has two threads that can be different. In this embodiment it is also possible that the core below one thread can be different from the core below the second thread. For example one core can be suitable for dense bone and a second core can be suitable for soft bone The difference between these core segments can be for example in their angle or/and external morphology. The implant can also have a spiral bone tap. In some embodiments the implant can have more than one bone tap. In some of these embodiments the bone taps of the novel implant are not identical. For example one bone tap can be cutting therefore suitable for dense bone and a second bone tap can be compressing and therefore suitable for soft bone.

The coronal region can have several configurations. A coronally tapering coronal region or/and an inversed tapered coronal region or/and a parallel wall coronal region. In some embodiments of the novel implant the coronal region is not identical all around. The coronal region can have parallel walls at its buccal and palatal aspects and inversed tapered coronal region at its mesial and distal aspects. With this configuration the implant is suitable for soft bone because of its parallel aspect and for dense bone because of its inversed tapered aspect. The dentist can decide where to position the parallel aspect and where to position the inversed tapered aspect. If the alveolar ridge is narrow it is recommended to position the inversed tapered region facing the buccal aspect. If the mesio-distal dimension is limited it is recommended to place the inversed tapered region facing the mesio and/or distal aspect. With this configuration a cross section of the coronal region perpendicular to the long axis of the implant is creating for example an elliptic outline instead of a round outline. The novel coronal region can have different tapering at different aspects of the coronal region. For example to have a parallel wall (parallel to the longitudinal axis of the implant) on one aspect, a coronally tapered region on another aspect and an inversed tapered region in another aspect of the coronal region. The distribution of different tapering around the coronal region can be different at different vertical heights along the coronal region. The coronal region can have micro slots. These slots can be circular along the same horizontal plane or to be along several vertical heights.

One advantage of this embodiment is that a dental implant is provided that addresses the problems described above. It has a unique combination of an implant body, threads profile, core profile, taps and coronal aspect that enhances stability in low-density bone but the insertion is easily done and the implant can be used also in dense bone with the appropriate surgical protocol and the direction of the implant is dictated by the high apical threads that prevent slipping of the implant.

The narrow coronal region or/and the coronal inversed tapered region of the implant (converging coronaly) is best to be placed below the bone level and the bone is touching or/and covering this region because the implant is designed to allow insertion with a small diameter drill or/and osteotom to allow elastic expansion of the cortical bone. The presence of bone above the implant supports the gums to achieve an esthetic result. In some preferred embodiments the implant is a one-piece implant. There are also provided several novel prosthetic systems that fit the new implant but can be also used for other implants.

Thus according to the teaching of the present invention there is provided A dental implant comprising: a body; a coronal part of the body; an apical part of the body; the apical part having at least two taps extending from the apical end of the apical part coronally, at least part of the right edge of the first tap is creating a first blunt angle with the external surface of the apical part and at least part of the left edge of the second tap is creating a second blunt angle with the external surface of the apical part.

According to a further feature of the present invention at least part of the right edge of the first tap is creating a first sharp angle or 90 degrees with the external surface of the apical part and at least part of the left edge of the second tap is creating a second sharp angle or 90 degrees with the external surface of the apical part.

According to a further feature of the present invention the first tap is a spiral tap, the spiral first tap extends from one side of the implant to the opposite side along more than a third of the length of the implant.

According to a further feature of the present invention the second tap is a spiral tap, the spiral second tap extends from one side of the implant to the opposite side along more than a third of the length of the implant.

According to a further feature of the present invention the second tap is a spiral tap, the spiral second tap extends from one side of the implant to the opposite side along more than a third of the length of the implant.

According to a further feature of the present invention at least part of the left edge of the first tap is creating a blunt angle with the external surface of the apical part.

According to a further feature of the present invention the first tap has two surfaces that the angle between them is larger than 90 degrees.

According to a further feature of the present invention the second tap has two surfaces that the angle between them is larger than 90 degrees.

According to a further feature of the present invention the second tap has two surfaces that the angle between them is equal or smaller than 90 degrees.

According to a further feature of the present invention the second tap has two surfaces that the angle between them is larger than 90 degrees.

According to a further feature of the present invention the second tap has two surfaces that the angle between them is equal or smaller than 90 degrees.

According to a further feature of the present invention the first tap has two surfaces that the angle between them is equal or smaller than 90 degrees and the second tap has two surfaces that the angle between them is equal or smaller than 90 degrees.

According to a further feature of the present invention at least one of the taps has two surfaces which are connected through a rounded zone.

According to a further feature of the present invention at least one of the taps has more than two surfaces.

According to a further feature of the present invention the taps are connected with each other by a slot in the apex of the implant.

According to a further feature of the present invention at least one of the taps is oriented to the right as extending from the apical part to the coronal part.

According to a further feature of the present invention at least one of the taps is oriented to the left as extending from the apical part to the coronal part.

According to a further feature of the present invention at least one of the taps is extended straight upwards from the apical part to the coronal part.

According to a further feature of the present invention at least one of the taps is wider in its apical region more than in its coronal region.

According to a further feature of the present invention at least one of the taps is wider in its coronal region more than in its apical region.

According to a further feature of the present invention the width of at least one of the taps is substantially constant while extending from the apical part to the coronal part.

According to a further feature of the present invention the first blunt angle and the second blunt angles are located substantially at the same distance from the apical end of the implant.

According to a further feature of the present invention the most apical part of the implant is more tapered than the apical part above the most apical part.

According to a further feature of the present invention the length of the most apical part is 2-6 mm.

According to a further feature of the present invention the length of the most apical part is 3-5 mm.

According to a further feature of the present invention the apical part having a tapered core with helical tapered thread extending along the tapered core.

According to a further feature of the present invention the apical part includes at least one segment having a tapered variable profile main helical thread extending along the core, the main thread having an apical side, a coronal side, a lateral edge connecting the apical side and the coronal side, a base touching the core, a height defined between the lateral edge and the base, a variable length of the lateral edge being progressively expanded substantially along the segment of the apical part in the direction of the coronal part, so that a least length of the lateral edge of the main thread is adjacent the apical end and a greatest length of the lateral edge of the main thread is adjacent the coronal part, and a variable height being progressively expanded substantially along the segment of the implant in the direction of the apical end, so that a least height of the main thread is adjacent the coronal part and a greatest height of the main thread is adjacent the apical end.

According to a further feature of the present invention the apical side of the main thread includes a flat shelf and the width of the main thread is further defined by a circumferential face extending between the apical side and the coronal side.

According to a further feature of the present invention the circumferential face has a flat face substantially perpendicular to the flat shelf and wherein the flat face has a width that progressively expands from the apical end toward the coronal part.

According to a further feature of the present invention the flat face narrows at the apical end and becomes sharp and thin.

According to a further feature of the present invention the apical end includes a rounded region.

According to a further feature of the present invention the main thread adjacent the apical end is self-tapping.

According to a further feature of the present invention the self-tapping thread is spaced from the rounded region.

According to a further feature of the present invention the body of the implant is tapered and wherein the main thread adjacent the apical end is self-tapping and adapted to cut bone.

According to a further feature of the present invention the apical part includes at least one segment having a second helical thread extending along the core.

According to a further feature of the present invention the second helical thread has substantially a constant profile.

According to a further feature of the present invention the second helical thread being a tapered variable profile helical thread extending along the core, the second thread having an apical side, a coronal side, a lateral edge connecting the apical side and the coronal side, a base touching the core, a height defined between the lateral edge and the base, a variable length of the lateral edge being progressively expanded substantially along the segment of the apical part in the direction of the coronal part, so that a least length of the lateral edge of the second thread is adjacent the apical end and a greatest length of the lateral edge of the second thread is adjacent the coronal part, and a variable height being progressively expanded substantially along the segment of the implant in the direction of the apical end, so that a least height of the second thread is adjacent the coronal part and a greatest height of the second thread is adjacent the apical end.

According to a further feature of the present invention the length of the main helical thread being more progressively expanded than the second helical thread.

According to a further feature of the present invention the height of the main helical thread being more progressively expanded than the second helical thread.

According to a further feature of the present invention, the diameter of the most coronal segment of the coronal part being smaller than the diameter of the coronal part just below the most coronal segment.

According to a further feature of the present invention the most coronal segment of the coronal part is tapered coronally forming narrower coronal edge.

According to a further feature of the present invention the most coronal segment of the coronal part has at least one coronal aspect having parallel external walls, the diameter of the coronal aspect is smaller than the diameter of the coronal part just below the aspect.

According to a further feature of the present invention the most coronal segment has a surface designed to be in contact with bone.

According to a further feature of the present invention the most coronal segment is designed to allow elastic expansion of the bone while inserting the implant inside the bone and after insertion of the most coronal segment the bone relapses to touch the most coronal segment.

According to a further feature of the present invention the implant has more than two threads.

According to a further feature of the present invention the threads reach the most coronal segment.

According to a further feature of the present invention the implant has micro-threads on the most coronal segment which are smaller than the threads over the apical part.

According to a further feature of the present invention below of at least one of the helical threads there is a micro-thread, the horizontal length of the micro-thread is 0.05-0.3 mm and the horizontal length of the helical thread at the most apical region is 0.5-1 mm.

According to a further feature of the present invention the horizontal length of the micro-thread is less than 0.2 mm and the horizontal length of the helical thread at the most apical region is more than 0.6 mm.

According to a further feature of the present invention below the main helical thread there are more than one micro-threads and below the second helical thread there are more than one micro-threads.

According to a further feature of the present invention the profile of at least one of the micro-threads is different from the profile of another of the micro-threads.

According to a further feature of the present invention the implant includes a protruding element configured to protrude through the gums to allow the connection to a dental prosthesis.

According to a further feature of the present invention the protruding element and the implant are one piece.

According to a further feature of the present invention the protruding element includes at least one region with an anti-rotational element.

According to a further feature of the present invention the protruding element is tapered coronally.

According to a further feature of the present invention the implant is connected to a prosthetic element, the prosthetic element can be any part of the group consisting of: abutment for cementation, abutment for screwed restoration, temporary abutment, dolder-bar, ball-attachment, connector, locator, crown, bridge, impression coping, healing cap, and any combination thereof.

According to a further feature of the present invention the apical end having a tapered core with helical thread extending along the tapered core, the apical end includes at least one region having coronal thread which is coronal to a coronal core segment which is coronal to an apical thread which is coronal to an apical core segment, the region is designed so when the most apical aspect of the border of the coronal core segment is continued by an imaginary straight line apically through the apical thread the line will be inside the apical core segment.

According to a further feature of the present invention, the borders of the core segments are forming parallel lines.

According to a further feature of the present invention, the borders of the core segments are not straight lines.

According to a further feature of the present invention, wherein the lateral edge is parallel to the long axis of the implant.

There is also provided according to the teachings of the present invention a dental implant comprising: a body; a coronal end of the body; an apical end of the body; the apical end having a tapered core with helical tapered thread extending along the tapered core, the apical end includes at least one region where the angle of the tapered core is larger than the angle of the helical tapered thread.

According to a further feature of the present invention, the apical end having coronal thread which is coronal to a coronal core segment which is coronal to an apical thread which is coronal to an apical core segment, the region is designed so when the most apical aspect of the border of the coronal core segment is continued by an imaginary straight line apically through the apical thread the line will be inside the apical core segment.

According to a further feature of the present invention, the coronally tapered aspect is designed to allow elastic expansion of the bone while inserting the wider area of the coronally tapered aspect inside the bone and after insertion of the narrow area of the coronally tapered aspect the bone relapses to cover the coronally tapered aspect.

According to a further feature of the present invention, the implant has more than one thread.

According to a further feature of the present invention, the threads reach the coronally tapered aspect.

According to a further feature of the present invention, the implant has threads on the coronally tapered region.

According to a further feature of the present invention, the protruding element is designed to get a wider collar that mimics the emergence profile of a natural tooth.

According to a further feature of the present invention, the protruding element is configured to be attached to an abutment from the side.

There is also provided according to the teachings of the present invention a dental implant comprising: a body; a coronal part of the body; an apical part of the body; said apical part includes an apical segment adjacent the apical end of said implant extending along one third of the length of said implant, said apical segment comprising a tapered core with a first external thread extending along said tapered core and a second external thread extending along said tapered core, said first thread having a first profile, said first profile being tapered variable profile, said first thread having an apical side, a coronal side, a lateral edge connecting said apical side and said coronal side, a base touching said core, a height defined between said lateral edge and said base, a variable length of said lateral edge being progressively expanded substantially along said apical segment of said apical part in the direction of said coronal part, so that a least length of said lateral edge of said first thread is adjacent said apical end and a greatest length of said lateral edge of said first thread is adjacent said coronal part, and a variable height being progressively expanded substantially along said apical segment of said implant in the direction of said apical end, so that a least height of said first thread is adjacent said coronal part and a greatest height of said first thread is adjacent said apical end, said second thread having an apical side of said second thread, a coronal side of said second thread, a lateral edge of said second thread connecting said apical side of said second thread and said coronal side of said second thread, a base of said second thread touching said core, a height of said second thread defined between said lateral edge of said second thread and said base of said second thread, said first thread having a first thread step, said second thread having a second thread step and a second thread profile, said first thread step being substantially equal to said second thread step, said first tapered thread profile being different from said second thread profile so said length of said lateral edge of said first thread adjacent the coronal end of said apical segment being larger than the length of said lateral edge of said second thread adjacent the coronal end of said apical segment.

There is also provided according to the teachings of the present invention a dental implant comprising: a body; a coronal part of the body; an apical part of the body;

said apical part having a lateral external surface, a first tap and a second tap extending along at least part of said apical part, when said coronal part being placed upwards and said first tap being viewed along said apical part at least part of a right edge of said first tap is creating a first angle with said external surface of said apical part and at least part of a left edge of said first tap is creating a second angle with said external surface of said apical part, said first angle being equal or smaller than 90 degrees, said second angle being larger than 90 degrees, when said coronal part being placed upwards and said second tap being viewed along said apical part at least part of a left edge of said second tap is creating a third angle with said external surface of said apical part and at least part of a right edge of said second tap is creating a fourth angle with said external surface of said apical part, said third angle being equal or smaller than 90 degrees, said fourth angle being larger than 90.

According to a further feature of the present invention, the first and/or the third angle are 20-85 degrees.

According to a further feature of the present invention, the first and/or the third angle are 30-80 degrees.

According to a further feature of the present invention, the first and/or the third angle are 40-70 degrees.

According to a further feature of the present invention, the first and/or the third angle are 45-65 degrees.

According to a further feature of the present invention, the second and/or the fourth angle are 91-170 degrees.

According to a further feature of the present invention, the second and/or the fourth angle are 100-160 degrees.

According to a further feature of the present invention, the second and/or the fourth angle are 110-150 degrees.

According to a further feature of the present invention, the second and/or the fourth angle are 120-140 degrees.

BRIEF DESCRIPTION OF THE DRAWINGS

FIG. 5 is a side elevation view of the novel implant having two tapers of the apical region.

FIG. 6 is a cross-sectional view of an embodiment of the novel implant with a rounded core segments and a double hex connection to an abutment.

FIG. 6A is a side elevation view of an abutment with a tapered anti rotational connection fitted to be installed over the implant of FIG. 6.

FIG. 7 is a side elevation view illustrating another embodiment of a dental implant of the present invention with micro-threads along the core of the implant.

FIG. 8 is a side elevation view illustrating an embodiment of the implant of FIG. 7 with a variable narrow coronal region.

DESCRIPTION OF THE PREFERRED EMBODIMENTS

Figure 1:
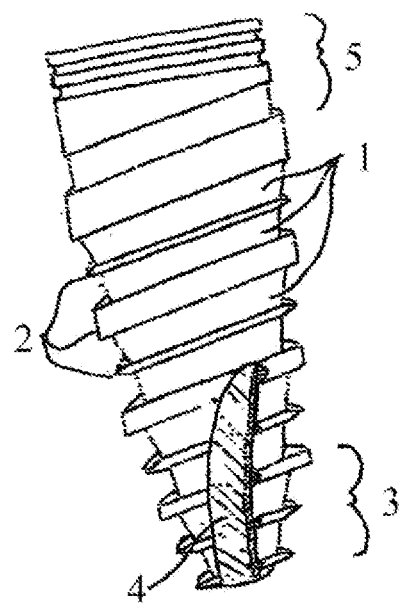
FIG. 1 is a side elevation view illustrating an embodiment of a dental implant of the present invention.

FIG. 1 illustrates an embodiment of the novel tapered condensing dental implant. There are several elements in a dental implant that influence the condensation, insertion and stabilization of the implant, including:

1) The core of the implant 1.
2) The Threads 2.
3) The most apical region 3 which touches the bone first.
4) The bone tap 4.
5) The most coronal region 5 which engages the cortical bone and the sometimes also the gums.

In order to have good stabilization in low density bone it is recommended to use a small diameter drill and a tapered implant. As the diameter of the drill is smaller and the implant is more tapered the bone is more preserved and more condensed resulting in improved stabilization, but the insertion is more difficult. In this case controlling the exact path of insertion of the implant becomes also more difficult since the implant has a tendency to slip towards the region with the lowest density. In order to use a small diameter drill and an implant with significant tapered configuration all five elements of the implant are recommended to be designed in harmony between them to allow an easy insertion and good control on the final position of the implant.

Figure 2:
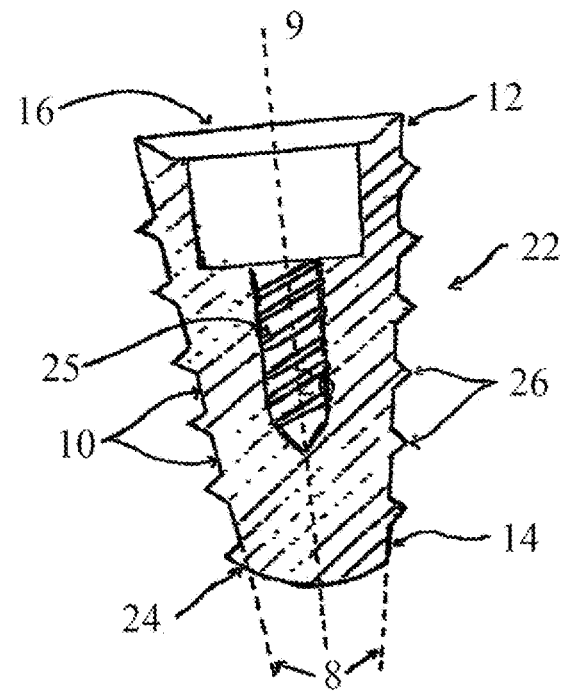
FIG. 2 is a cross-sectional view illustrating a regular tapered dental implant.

In order to clarify the novelty of the new implant it will be compared to a regular tapered implant like the implant illustrated in FIG. 2. The implant has a coronal end 12 and an apical end 14. The implant has five distinct regions. At the most coronal aspect there is an implant-prosthetic interface region 16. Moving from the coronal to the apical ends the implant can have an optional mechanical stop region (not shown), an optional cylindrical region (not shown), a tapered region 22, and a bone cutting end region 24 which is self drilling and self tapping. An internal threaded portion 25 is provided for the attachment of prosthetic components.

The interface region 16 provides mechanical interlock between the implant and the prosthetic components (not shown) attached to the implant. Interface region 16 also provides a means of applying torque to the implant and thus driving the implant into the selected site. The interface region 16 can be any of a number of known interfaces, including external splines or/and internal geometric shapes such as polygons or Morse tapers.

The optional mechanical stop region can be sharply tapered so that when the implant is screwed into a prepared osteotomy, the stop limits inadvertently placing the implant too deeply. The implant of FIG. 2 has a uniform thread 26 extending along the body of the implant.

Figure 3:
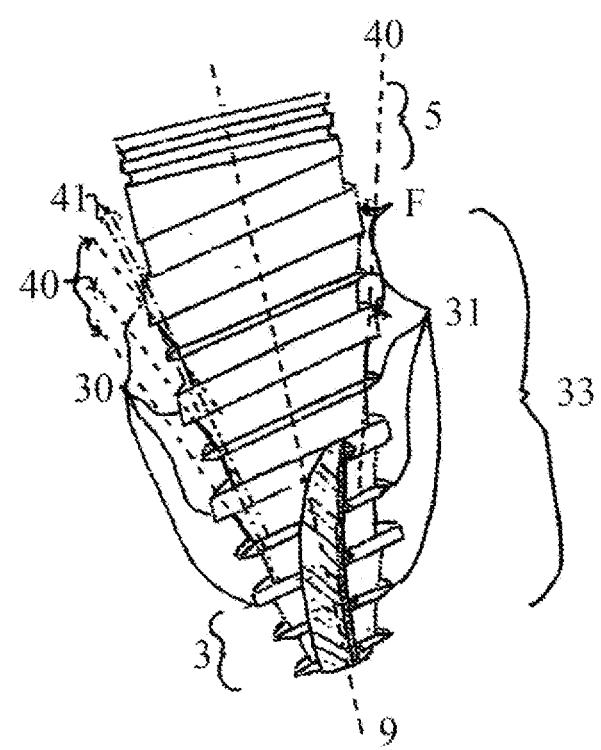
FIG. 3 is a side elevation view illustrating an embodiment of a dental implant of the present invention having two types a gradual condensing core segments.

In one embodiment of the implant of the present invention illustrated in FIG. 3 there are two different threads 30, 31. The tapered region 33 of FIG. 3 has on its external surfaces one thread 30 with a variable thread profile. The external thread 30 includes a progressively changing profile. At the apical end 3, the thread 30 is sharp narrow and long horizontally in order to facilitate cutting and self-tapping into bone. As the thread 30 progresses towards the implant coronal end 5, its tip becomes increasingly broad or wider in the apical-coronal direction and increasingly lower in the horizontal direction in cross-sectional profile. The increasing breadth of thread 30 facilitates compression of low-density bone previously tapped by the sharp apical thread profile. Bone compression increases the stability of the implant. The decreasing height allows easy insertion and dictates that the implant will keep its first direction while it is inserted. As the thread 30 progresses from coronal to apical ends, 5 and 3 respectively, of the implant, the thread 30 becomes sharper, thinner and horizontally longer. Thread 30 is profiled so that a path cut in the bone is gradually broadened by compression due to the progressively broader thread 30 (vertically broader). In this embodiment the threads are tapered and the core is more tapered resulting in horizontally long threads at the apical region.

Compressive threads are suitable for soft bone. If both threads are compressive and become wider coronaly it will be difficult to insert the implant in dense bone unless the drilling is changed significantly. Therefore in the second thread 31 the vertical height can be increased less in the coronal region or/and to be uniform or/and can be sharp to allow easy insertion. The combination of a compressive thread and less compressive or/and uniform thread makes the implant to be suitable for several bone types. This configuration is suitable also for very dense bone. In highly dense bone sometimes the blood supply is compromised resulting in implant failure. The novel implant of FIG. 3 has high and spaced threads leaving spaces between them after insertion into dense bone following drilling with a wide drill. These spaces will promote blood vessels proliferation and bone regeneration.

Figure 4:
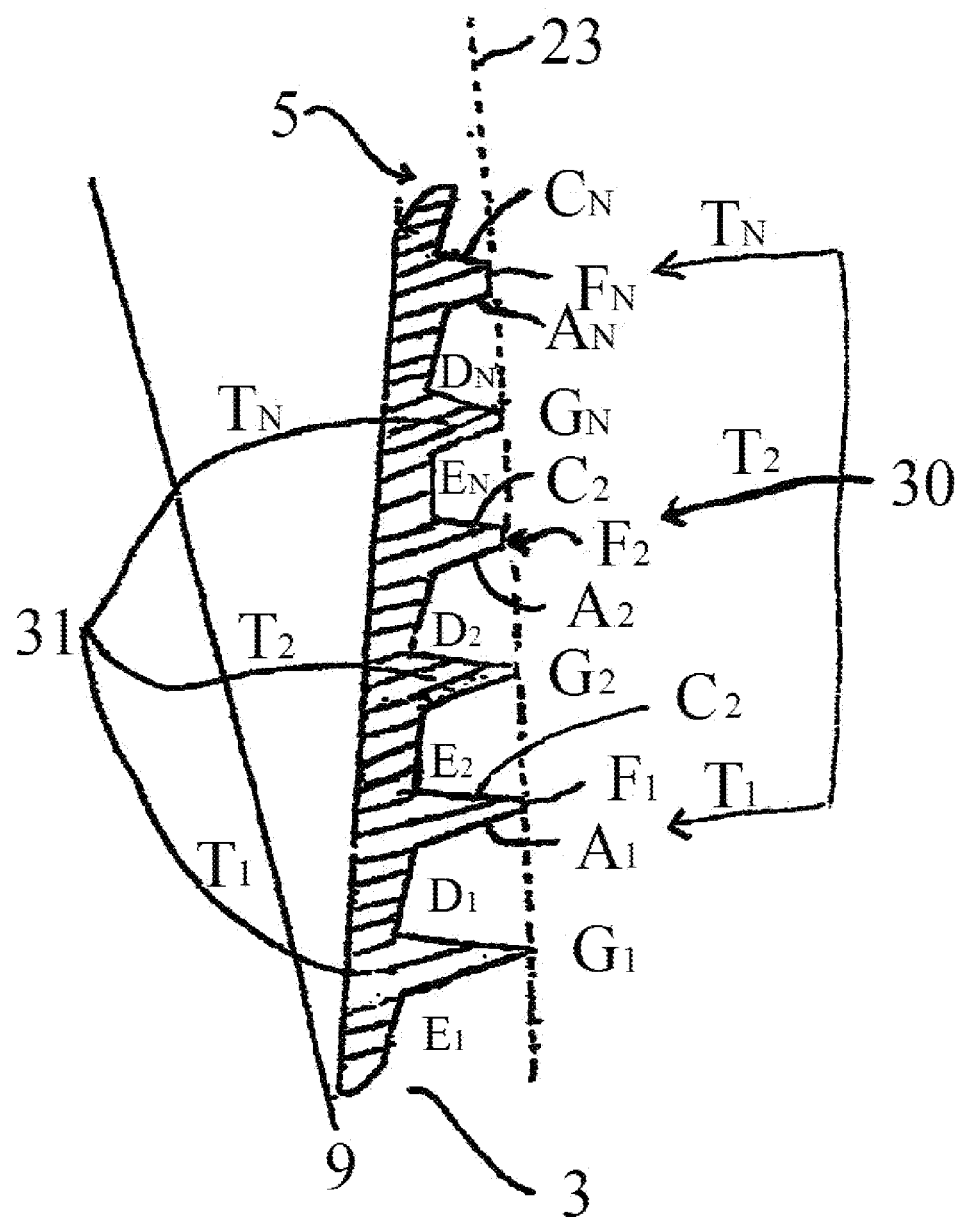
FIG. 4 is a cross-sectional view illustrating an embodiment of a dental implant of the present invention illustrating two different variable threads.

FIG. 4 illustrates in a cross-sectional view an embodiment of a variable profile thread 30. Each turn T of thread 30 is of a different profile from each other turn T of thread 30 along at least part of the implant. For example, the implant includes a plurality of turns $T_1, T_2, T_3, \ldots T_N$.

Each turn T includes an apical side A and a coronal side C and flat face F connecting A and C. The length of F varies by being continuously expanded in the direction of the coronal end 5. The length of A and C varies by being continuously expanded in the direction of the apical end 3.

As such, a first turn $T_1$, includes an apical side $A_1$, a coronal side $C_1$, and $F_1$. A second turn $T_2$ includes an apical side $A_2$, a coronal side $C_2$, and a $F_2$. The same pattern is repeated for turns $T_1, T_2, T_3, \ldots T_N$. so that a least length $F_1$, of the thread 30 is adjacent the apical end 3, and a greatest length $F_N$ is adjacent the coronal end 5. The least length $A_N$ of the thread 30 is adjacent the coronal end 5, and a greatest length A.sub.1 is adjacent the apical end 3. The least length C.sub.N, of the thread 30 is adjacent the coronal end 5, and a greatest length C.sub.1 is adjacent the apical end 3. The apical side of the thread (A1,2,3 . . . ) can be a flat shelf perpendicular to the long axis 9 of the implant or/and with a non 90 degrees angle to the long axis of the implant as illustrated in FIG. 4 or/and with combination of more than one angle. In addition, the external thread 30 may have a flat shelf (A1,2,3 . . . ) and rounded tip (F1,2,3 . . . ), which are most pronounced at the thread's coronal end 5. The flat shelf provides support against implant micro-motion imposed by axial loads, advantageous in low-density bone. The tip of the thread (F1,2,3 . . . ) can be flat and/or rounded. The angle of each thread segment meaning the angle between A and C of FIG. 4 is about 60 degree in some implants. To allow cutting of the bone a more sharp angle is preferred at 30-40 or/and about 35 degree. In some preferred embodiments all the threads have the same angle between A and C. In another preferred embodiment the angle between A and C is gradually increased coronally to get more condensation for soft bone or gradually decreased coronally for dense bone.

In the preferred embodiments of FIGS. 3 and 4, a circumferential face F is included on some turns of thread 30. The face F can be flat on the more coronal threads or/and can be sharp on the self-tapping portion of the thread, adjacent the apical end 3, but is provided as each turn progressively widens toward the coronal end 5. The face F can be parallel to the long axis 9 of the implant but it can be also angled.

The second thread 31 as illustrated in FIG. 4 is extending along the implant in the spaces between the thread steps of the first thread 30. The vertical height of the second thread 31 can be changing less compared to the first thread 30 and can remain the same along at least part of the implant for example along most of the coronal part of the implant. The horizontal dimension of the second thread 31 can be increased in the apical direction so the thread 31 at the apical region 3 is long and sharp and the thread 31 close to the coronal region 5 is short and sharp. The angle of the second thread between the upper aspect D of the second thread 31 and the lower aspect E of the second thread 31 can be 20-70 degrees or/and 25-45 degrees or/and 30-40 degrees or/and about 35 degrees.

FIG. 4 illustrates the variable profile thread 31. Each turn T of thread 31 is of a different profile from each other turn T of thread 31. For example, the implant includes a plurality of turns T.sub.1, T.sub.2, T.sub.3, . . . T.sub.N. Each turn T includes an apical side E and a coronal side D and flat face G connecting D and E. The length of G varies by being continuously expanded in the direction of the coronal end 5 or/and being constant. The length of D and E varies by being continuously expanded in the direction of the apical end 3 or/and being constant.

As such, a first turn T.sub.1, includes an apical side D.sub.1, a coronal side E.sub.1, and G.sub.1. A second turn T.sub.2 includes an apical side D.sub.2, a coronal side E.sub.2, and a G.sub.2. The same pattern is repeated for turns T.sub.1, T.sub.2, T.sub.3, . . . T.sub.N. so that a least length G.sub.1, of the thread 31 is adjacent the apical end 3, and a greatest length G.sub.N is adjacent the coronal end 5. The least length D.sub.N, of the thread 31 is adjacent the coronal end 5, and a greatest length D.sub.1 is adjacent the apical end 3. The least length E.sub.N, of the thread 31 is adjacent the coronal end 5, and a greatest length E.sub.1 is adjacent the apical end 3. The apical side of the thread can be a flat shelf perpendicular to the long axis 9 of the implant or with a non 90 degrees angle to the long axis of the implant as illustrated in FIG. 4 or/and with combination of more than one angle. In addition, the external thread 31 may have a flat shelf or/and rounded tip, which are most pronounced at the thread's coronal end 5. The tip of the thread G can be flat or/and rounded or/and sharp. In some embodiments all the threads have the same angle between D and E. In another preferred embodiment the angle between D and E is gradually increased coronally to get more condensation for soft bone or gradually decreased coronally for dense bone.

An implant with double thread each thread with a double step allows insertion in half the turns needed for an implant with one thread while keeping the outer surface and the stability of the implant. The implant can have more than two threads.

In one embodiment the angle of the first thread 30 (between A and C) can be the same as the angle of the second thread 31 (between D and E). In another embodiment the angle of the first thread 30 (between A and C) can be larger than the angle of the second thread 31 (between D and E). In another embodiment the angle of the first thread 30 (between A and C) can be smaller than the angle of the second thread 31 (between D and E).

In some of the preferred embodiments of FIGS. 3 and 4 a circumferential faces F and G is included on some turns of thread 30 and 31. The faces F and G can be flat and can be sharp at the self-tapping portion of the threads 30 and 31, adjacent the apical end 3, but are provided as each turn progressively widens toward the coronal end 5. The faces F and G can be parallel to the long axis 9 of the implant but they can be also angled.

In one preferred embodiment along at least one segment of the implant the difference between the vertical height of successive threads (F.sub.N–F.sub.N-1) of the first thread 30 is preferably larger than the difference between the vertical height of successive threads (G.sub.N–G.sub.N-1) of the second thread 31. In another preferred embodiment at least along one segment of the implant the difference between the vertical height of successive threads (G.sub.N–G.sub.N-1) of the second thread 31 is zero or the vertical height of successive threads of thread 31 are substantially equal. In another preferred embodiment the vertical height of the threads (G) of the second thread 31 is becoming larger in the coronal direction along the apical segment of the implant and afterwards remain constant along most of coronal segment of the implant, whereas the vertical height (F) of the first thread is increasing in the coronal direction along the apical segment and/or also along most of the coronal segment of the implant. In this configuration the implant has at least along a segment of the implant on one side of the implant a thread with a certain height F and on the other side of the implant substantially at the same vertical location 50 a thread with a smaller height G as illustrated in FIG. 5. Also the horizontal length of the threads 30, 31 of the implant substantially at the same vertical location can be different. A subN can be larger than D subN and/or C subN can be larger than E subN. Also the increase in the horizontal length of the threads can be different for example (A subN–A sub N-1) can be larger than (E subN–E subN-1) or/and (C subN–C sub N-1) can be larger than (D subN–D subN-1)

The base of the thread where the thread is touching the core of the implant can be of constant and/or equal height for both threads 30, 31 or/and can be different for each thread or/and can be constant for each thread but different. For example the vertical height of the base of the first thread can be constant along at least a segment of the implant and larger than the vertical height of the base of the second thread which is also constant along at least a segment of the implant.

In some preferred embodiments the horizontal length of the first thread can be larger than the horizontal length of the second thread. As illustrates in FIG. 5 the tips of the second thread don't reach the line 23 connecting the tips of the first thread. In another preferred embodiment the length of both threads are substantially the same as illustrated in FIG. 4. It is also possible that the length of the second thread is larger than the length of the first thread. In case that the length of the threads is changing along the implant the length of the first thread is can be different than the length of the second thread in the same vertical height, for example in FIG. 5 the length of the first thread on the right side of the implant crossed by line 50 is larger than the length of the second thread on the left side of the implant crossed by line 50.

The length of the first or/and the second thread can be 0.4-1 mm or/and 0.6-0.8 mm at the apical region and/or reduced in the coronal region to a length of 0.1-06 mm or/and 0.2-0.4 mm.

There are several embodiments of how the vertical height of the thread is increased. In one embodiment the vertical dimension of the thread (thread 30 in FIG. 3) is increased upwards and downwards relatively to the previous thread, or in other words at least along part of the implant the middle of a thread is at same distance from the middle of the thread before and from the middle of the thread afterward. This distance is the thread step, so when the implant is inserted the bone above and below the thread is compressed. In another embodiment the vertical height of the thread is increased more upwards than downward relatively to the previous thread to compress more the bone above the thread. In some embodiments the thread can be designed even to compress only the bone above the thread. In another preferred embodiment along at least part of the implant the vertical height of the thread is increased more downwards to compress more the bone bellow the thread than the bone above the thread or even to compress only the bone below the thread. This last embodiment is preferred for most biological conditions since the upper region of the bone are usually denser than the lower region and is better to compress the softer bone than to compress the denser bone. In these embodiments the distance between the middle of successive threads along at least part of the implant can be constant (the thread step) or/and increasing towards the apical region or/and increasing towards the coronal region. In some embodiments the distance between the middle of successive threads along at least part of the implant can be constant (the thread step) or/and increasing towards the apical region and along at least another part of the implant increasing towards the coronal region. In another preferred embodiment the vertical height of the threads along the apical segment of the implant are increasing upwards and downwards and the vertical height of the threads along the coronal segment of the implant are increasing more downwards or only downwards because the bone in the coronal region includes the dense cortical bone and the bone in the apical region has basically soft spongious bone.

The length of the apical segment can be about 5 mm and in some cases 2-4 mm. The length of the apical segment can be a fixed length for all implant lengths or it can be one quarter to one third of the implant length.

This variable change in the direction of the increase of the vertical height of the thread can be applied to the first thread 30 alone or to both threads in case the vertical height of the second thread 31 is also increased coronally.

Both threads can be also tapered. In this embodiment the line 23 connecting the tips of the first thread 30 is not parallel to the long axis 9 of the implant as illustrated in FIGS. 4 and 5. The threads are tapered and at the same time become higher apically because the core of the implant is more tapered than the threads. Lines 25 in FIG. 5 are connecting the upper regions of the core segments below the first thread. Lines 25 in FIG. 5 are more tapered than lines 23 connecting the tips of the first thread. In one preferred embodiment the tips of both threads are substantially along the same tapered line 23 as illustrated in FIG. 4. In another preferred embodiment the first thread 30 is more tapered than the second thread 31. In other wards the line connecting the tips of the first thread is more tapered than line connecting the tips of the second threads. In another embodiment the line connecting the thread tips of the first thread 30 is tapered and the line connecting the tips of the second thread 31 is parallel to the long axis 9 of the implant.

In another preferred embodiment the first thread 30 is less tapered than the second thread 31. In other wards the line connecting the tips of the first thread is less tapered than line connecting the tips of the second threads. In another embodiment the line connecting the thread tips of the second thread 31 is tapered and the line connecting the tips of the first thread 30 is parallel to the long axis 9 of the implant.

Therefore along at least part of the implant the angle between the line connecting the tips of the first thread 30 and the long axis of the implant 9 can be larger or equal or smaller than the angle between the line connecting the tips of the second thread 31 and the long axis of the implant 9.

In most of these embodiments it is preferred that the most apical region is more tapered than the rest of the implant as illustrated in FIG. 5. Lines 27 connecting the tips of the threads at the apical region are more tapered than lines 23 connecting the tips of the threads at the coronal region. This enlarged tapering of the most apical region can be applied for the core alone or/and to one of the threads or/and to both threads or/and to the core and both threads which is the preferred embodiment. The length of this most apical region can be 2-5 mm or even 3-4 mm. The fact that the width of the apical region of the implant is smaller than the coronal region allows the use of a small diameter drill therefore preserving the bone. The sharp apical threads enter the small hole in the bone and start cutting the bone. The next thread is wider in the coronal apical direction and the implant is wider causing compression of the bone but since the horizontal length of the thread is less than the previous thread the thread stays in the path created in the bone by the previous thread therefore preventing slipping of the implant to a region with even lower density bone. The fact that the horizontal length of the threads become smaller as going coronally allows for gradual compression of the bone and facilitate insertion.

In another preferred embodiment of the present invention illustrated in FIG. 5 the coronal region is less tapered than the more apical region of the implant. In this embodiment the implant can have three different regions having different tapering, the most apical region is the most tapered to allow insertion through small osteotomy. The middle region of the implant is slightly tapered to condense the bone and the coronal region is less tapered to reduce the compression from the cortical bone. The coronal region in another preferred embodiment can be parallel or even inversed tapered.

The shape of the core of a standard implant can be seen in segments 10 in the spaces between the threads in cross-sectional view FIG. 2. When connecting the outer border of these segments two straight lines 8 are formed as illustrated in FIG. 2. This configuration can cause strong resistance for insertion. In one embodiment of the present invention the resistance for insertion is reduced while improving the stability of the implant. In one preferred embodiment when continuing the lines of the outer borders of the core segments more than two lines are formed. These lines can be non-parallel or/and parallel lines 40 as illustrated in FIG. 3. In another preferred embodiment the lines continuing the outer border of the core segments below the condensing first thread 30 are forming parallel lines 40 and the lines continuing the outer border of the core segments below the sharp second thread 31 are forming other parallel lines 41. In some preferred embodiments the lines 40 below the condensing first thread 30 are more tapered than the lines 41 below the sharp second threads 31 as illustrated in FIG. 3. Therefore two thread units are in this embodiment. A condensing unit having a condensing first thread 30 and/or a condensing tapered core below the first thread and a cutting unit having a sharp second thread 31 and/or a less condensing core below the sharp second thread. In another preferred embodiment the more tapered core is located below the sharp threads 31. The location and degree of the tapering of the condensing core can be adjusted to the bone density. This configuration enables gradual condensation since the diameter of the lower aspect of each segment is close to the upper diameter of the previous apical segment below the same thread. This gradual condensation of the core allows for easy insertion of the implant without loosing the final condensation and stability since the difference in the diameter between two core segments below the same thread is the same as for a regular implant like the implant in FIG. 2. The final condensation is even larger since the core condenses the bone like a more tapered core. The angle between the lines 40 of the core segments in FIG. 3 of the novel implant and the long axis 9 of the implant in one embodiment are greater than the angle between the lines 8 of the regular tapered implant of FIG. 2 and the long axis 9 of the implant or/and the angle between the lines 25 in FIG. 5 connecting the core segments and the long axis 9 of the implant. The implant of FIG. 3 is tapered like the implant of FIG. 2. (the angle between lines 8, or the angle between lines 25 in FIG. 5) but condenses the bone like a more tapered implant (the angle between lines 40) and the condensation is gradually to facilitate insertion.

The lines 40 and 41 of FIG. 3 which are the continuation of the border of the core segments are parallel and straight. This is one embodiment, but there are other shapes of the border of the core segments that can function similarly or even better. We can examine this character of the core of the implant for example in FIG. 6 that illustrates a dental implant with a rounded border of the core segment. By continuing the border of a core segment 60 positioned coronaly to a thread 62 through the thread 62 by imaginary line 63. If the imaginary line enters inside the core segment 64 apically to the thread 62 it will function the same to allow gradual condensation, but the condensation is strong only on the upper region of the core border. The preferred embodiment with straight border lines as illustrated in FIG. 3 allows for gradual condensation along all the border so the insertion is smoother.

The combination of a gradual tapered compressing core as described above with a gradual compressing tapered thread as described above enables an easy insertion.

In one embodiment of the present invention along the core of the implant there is at least one micro-thread. FIG. 7 illustrates a preferred embodiment with two micro-threads.

The horizontal length and/or the vertical height of the micro-threads 70 is about 0.03-0.4 mm or/and 0.1-0.2 mm. The presence of micro threads along the core of the implant increases the surface of the implant and increases the penetrability of the implant. The resistance for insertion is reduced while improving the stability of the implant. In one preferred embodiment when connecting the tips of these micro threads one or more non-parallel lines are formed. In another preferred embodiment the line connecting the tips of the micro-threads along the core segments below the condensing first thread 30 are forming one or more parallel lines and the line connecting the tips of the micro-threads along the core segments below the sharp second thread 31 are forming other one or more parallel lines. In some preferred embodiments the one or more lines connecting the tips of the micro threads along the core segments below the condensing first thread 30 are more tapered than the one or more lines connecting the tips of the micro-threads along the core segments below the sharp second thread 31. In some preferred embodiments the one or more lines connecting the tips of the micro threads along the core segments below the condensing first thread 30 are less tapered than the one or more lines connecting the tips of the micro-threads along the core segments below the sharp second thread 31. Therefore two thread units are in this embodiment. A condensing unit having a condensing first thread 30 and/or a condensing tapered core with tapered micro threads below the first thread and a cutting unit having a sharp second thread 31 and/or a less condensing core with less tapered micro threads below the second thread. In another preferred embodiment the more tapered core with the micro threads is located below the sharp threads 31. In another preferred embodiment illustrated in FIG. 7 the micro-threads below the first thread can be along one line, at least along part of the implant and/or the micro-threads below the second thread can be along one other line, at least along part of the implant. It is also possible that all the tips of the micro threads below the first and second threads will be along the same line.

In the embodiments with the micro-threads the profile of each micro-thread can be different. For example the lower micro-thread 82 can be sharp and the upper micro-thread 81 can be rounded or/and less sharp as illustrated in FIG. 8. In another preferred embodiment the upper micro-thread is sharper. In another preferred embodiment the micro-threads below the second thread are sharp and the micro-threads below the first thread are rounded or/and less sharp. The micro threads can be variable threads and all the properties and differences described above for the first and second threads can be also implemented in the micro-threads and all the combinations of different micro-threads can be used.

In another preferred embodiment the number of micro threads below the first thread can be different from the number of micro-threads below the second thread along at least part of the implant. For example the core below the condensing first thread can have three micro-threads and the core below the cutting second thread can have two micro-threads. The properties of each micro-thread below the first thread can be different from the properties of each micro-thread below the second thread. The presence of several micro-threads is creating several micro helical slots between the micro-threads which are known to facilitate the bone growth around the implant.

In the embodiment illustrated in FIG. 7 the implant has six threads. A first variable thread and two micro-threads below it and a second variable thread and two other micro-threads below it. Since in some embodiments at least along part of the implant the first and second threads are horizontally long at the apical region a large difference exist between the horizontal length of the threads and the horizontal length of the micro-threads. The threads at least in the apical region can be 10-20 times longer in the horizontal dimension than the micro-threads. The threads can also be 3-8 times longer than the micro-threads or 4-7 times longer. The large difference between the threads and the micro-threads along the apical region function in synergistic action to facilitate the insertion. The sharp threads are cutting the bone and the large space between the threads allow for the aggregation of small bone particles. The micro-threads are cutting their way between these bone particles so the core is not just compressing the bone it is also cutting the bone to facilitate the insertion. The embodiment of the core with micro-threads is therefore suitable for soft bone because of its tapering and compressive properties but is also suitable for dense bone since it is also cutting. The large space between the threads enables the proliferation of vascular tissue and regeneration of bone tissue. This feature is advantageous in dense bone where the regenerative capability is reduced.

In most of the embodiments the thread step of the various threads can be substantial the same. In order to increase the stability of the implant in soft bone it is also possible to use several thread steps for the first or/and the second threads or/and the micro-threads. It is also possible to use at least in some of the threads at least along a portion of the threads a variable thread step. The thread step can increase gradually in the apical direction or in the coronal direction. Changes in the thread step are advantageous in soft bone.

Figure 9:
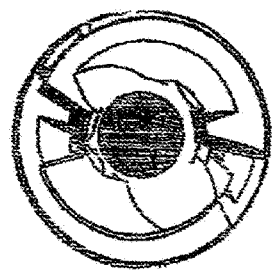
FIG. 9 is a bottom elevation view illustrating an embodiment of the apical blades.

The most apical region of the implant can have two preferred configurations. One is a smooth rounded design, this design is suitable for cases that the implant is near the Schneiderian membrane of the maxillary sinus or near the mandibular nerve in order to prevent damage to these delicate tissues. In this design the threads start with a distance from the apical end. In another preferred embodiment of the apex of the implant illustrated in FIG. 9 there are sharp blades that cut the bone and allow easy insertion. There are several variations for the shape of the blades, which are well known in the dental implant field. Implants with this apical design are called self drilling implants. FIG. 9 is an apical view of one embodiment. It can be seen in this embodiment that the diameter of blades are enlarged as going coronally since the apical region is tapered.

The bone tap of the implant influence the insertion. A\tap is also known in the name of a flute and it means a slot in the apical region. The presence of a bone tap allows the insertion of the implant without previous taping of the bone. Implants with a tap are called self tapping implants. The tap can be straight or/and oblique or/and spiral. One preferred design is the spiral bone tap to facilitate insertion. In one embodiment the tap 66 as illustrated in FIG. 7 is long and going through more than a third of the length of the implant crossing several threads. The tap can extend along more than a half of the implant. In another embodiment the tap is not straight but surrounding the implant. The tap starts at one side of the implant FIG. 7 and extends to the other side. In some preferred embodiments the whole tap can't be seen from one place. This design of the tap facilitate insertion so when the implant is inserted only part of one thread is cutting the bone therefore the resistance for insertion is lower. This configuration together with the design of the thread as described above also dictates that the implant will stay in its original path of insertion by forcing the next thread to go into the slot in the bone prepared by the previous thread. This feature is enhanced by the presence of a double thread.

Figure 11A:
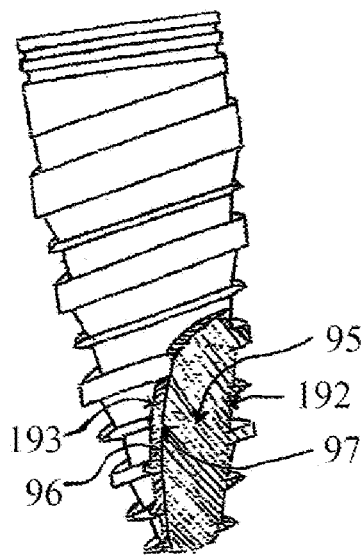
FIG. 11A is a side elevation view illustrating an embodiment of a dental implant of the present invention with a condensing tap.
Figure 10:
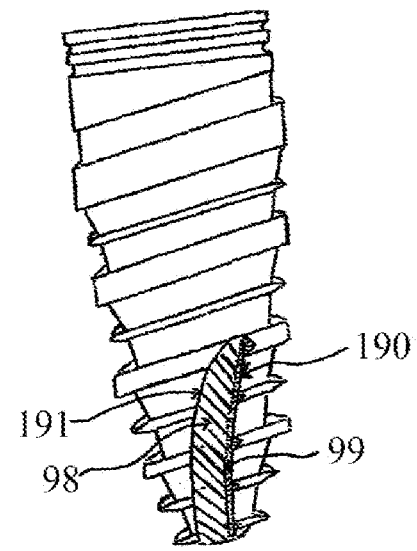
FIG. 10 is a side elevation view illustrating an embodiment of a dental implant of the present invention with a cutting tap.
Figure 11B:
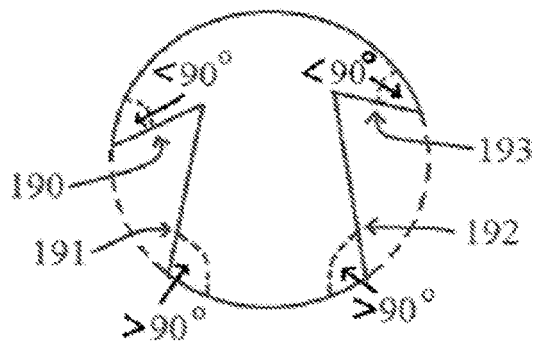
FIG. 11B is a horizontal sectional view through the apical segment of an embodiment of an implant having a cutting tap and a condensing tap.

The implant can have more than one tap. In one preferred embodiment with more than one tap the taps are different. In all the implants in the market if they include more than one tap the two taps are identical. In some preferred embodiments of the present invention at least along part of one tap the tap is a cutting tap and at least along part of another tap the tap is a condensing tap. Almost all the implants in the market have a cutting tap meaning the angle between the right side 190 of the tap and the external surface of the implant is less than 90 degrees or equal 90 degrees and the angle between the left side 191 of the tap and the external surface of the implant is more than 90 degrees as illustrated in FIG. 10. The external surface of the implant can include the core or/and the threads. In this configuration when the implant is inserted and rotated clockwise the tap is cutting the bone to facilitate insertion. In a condensing tap the angle between the right side 192 of the tap and the external surface of the implant is more than 90 degrees and the angle between the left side 193 of the tap and the external surface of the implant is less than 90 degrees or equal 90 degrees as illustrated in FIG. 11A. The external surface of the implant can include the core or/and the threads. In this configuration when the implant is inserted and rotated clockwise the tap is condensing the bone to improve the stability of the implant. If the bone is denser sometimes it becomes difficult to insert an implant with condensing taps. In this situation when rotating the implant backwards 2-3 turns the condensing tap becomes a cutting tap which cuts the bone, so afterwards when rotating the implant forward again the insertion is easy. An implant with cutting taps is more suitable for dense bone, an implant with condensing taps is more suitable for soft bone. In some of the embodiments of the present invention the implant has a synergistic combination of a condensing tap and a cutting tap. In this configuration the implant is suitable for all bone types. The cutting tap is cutting the bone to facilitate insertion and the condensing tap is condensing the bone to improve the stability of the implant. In case the insertion is still difficult then by rotating the implant counter-clockwise 2-3 turns the condensing tap will cut the bone so afterwards it will be easy to insert the implant. Actually the two opposite bone taps are working together to allow easy insertion and good stability in all bone types by using basically the same drilling protocol. FIG. 11B is illustrating a horizontal sectional view through the apical segment of an embodiment of an implant having a cutting tap and a condensing tap like the taps illustrated in FIGS. 10 and 11A. The cutting tap can be cutting inside the bone and creating small slots and small bone particles and then the condensing tap can compress these small bone protrusions and bone particles to increase the stability of the implant. The cutting tap is preparing the site for the compressing tap so the final result is a compress bone achieved easily with less torque and minimal trauma to the bone.

In one preferred embodiment the condensing tap as illustrated in FIG. 11A has two planes or surfaces, one long plane 95 on the right side and a short plane 96 on the left side. The transition from the long plane to the short plane can be sharp 97 or/and rounded. In another preferred embodiment the cutting tap has two planes or surfaces, one long plane 98 on the left side and a short plane 99 on the right side. The transition from the long plane to the short plane can be sharp or/and rounded. The condensing and cutting taps can also have more than two planes for example FIG. 7 illustrates a condensing tap 66 with three planes. The angle between the planes in most of the embodiments can be equal or smaller than 90 degrees or/and larger than 90 degrees. In another embodiment at least part of the tap has rounded morphology instead of straight surfaces. The novel implant can have any combination of taps. For example, a cutting tap with two planes on one side of the implant and a condensing tap with three planes on the other side of the implant.

The taps can be tilted to the right side or/and to the left side of the implant or substantially straight extending upwards from the apical part towards the coronal part. In some preferred embodiments both taps are spiral tap which are tilted to the right side of the implant, like the taps illustrated in FIGS. 7, 8, 10 and 11A.

Figure 12:
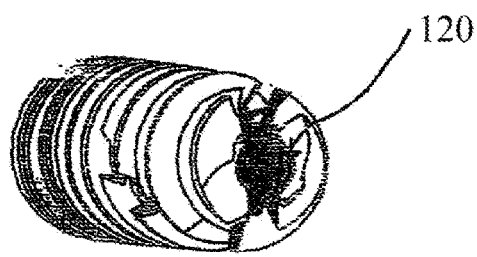
FIG. 12 is a side-bottom elevation view illustrating another embodiment of a dental implant of the present invention having two taps which are connected with a slot at the apex of the implant.

The taps can have substantially a uniform width as advancing from the apex coronally. In another embodiment the width of at least one tap can be increasing in the coronal direction along at lest part of the tap or/and the width of at least one tap can be decreasing in the coronal direction along at lest part of the tap. In another preferred embodiment the taps can be connected to form a continuous slot from one side of the implant to the other side. There are several options to accomplish this connection of the taps. One option is that one tap is tilted to the right of the implant and the second tap is tilted to the left of the implant so both taps are connected on one side of the implant. Another option is that the apex of the implant has a slot 120 so the taps are connected at the apex as illustrated in FIG. 12. In this embodiment the bone particles which are cut by the cutting tap can be advanced through the slot at the apex inside the condensing tap which will condense these bone particles. Another option is that a slot is added to connect the taps several mm above the apex.

In another embodiment the tap can change its function as it is advance coronally. For example the tap can be cutting at its apical region and to become condensing at its coronal region. In another embodiment the tap can be condensing at its apical region and to become cutting at its coronal region. In one preferred embodiment the implant can have on one side a changing tap from cutting at the apex to condensing more coronally and/or on the other side the implant can have a second changing tap from condensing at the apex to cutting more coronally. In this preferred embodiment the forces are more evenly distributed around the implant and the insertion becomes smoother.

The taps can also include a region where the angles on both sides of the tap are blunt (condensing) or/and a region where the angles on both sides of the tap are sharp (cutting). In some of the preferred embodiments at the same distance from the apex the tap on one side of the implant is condensing and the tap on the other side is cutting. The implant can have more than two taps. If there is more than one tap any combination of taps and/or edge angles or/and planes can be at the same distance from the apex.

Figure 13:
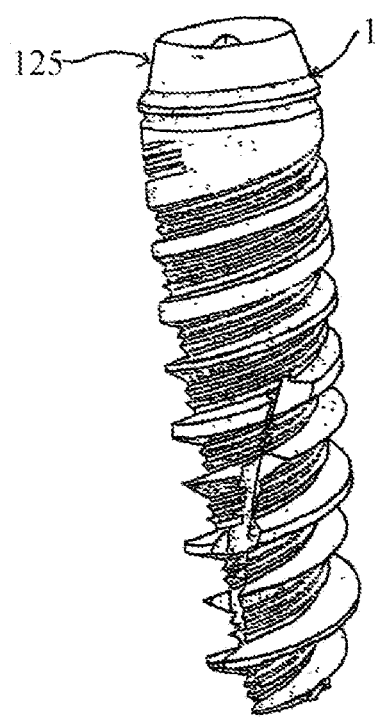
FIG. 13 is a side elevation view illustrating another embodiment of a dental implant of the present invention with an inversed tapered coronal region.

The most coronal region of the implant also influences the insertion and stabilization of the implant. This region includes the interface region. There are several types of interfaces which may optionally include splines, or/and a socket having a tapered region or/and a socket having a plurality of sides, e.g. a hex socket. Also, the implant may include an external sharply tapered mechanical stop, but in a preferred embodiment instead includes a gradually tapered portion. The gradually tapered portion allows for more freedom in placement depth to adjust the vertical positioning of the implant in relation to the crestal bone. When an implant is sharply tapered its most coronal region becomes very broad. This broad coronal is appropriate for regions with very low density cortical bone since it compress the cortical bone. In cases the cortical bone is not very soft this can interfere with the insertion of the implant. There are also clinical evidences that when the coronal region is broad the blood supply to the bone around the implant is disturbed resulting in higher incidence of bone resorption and implant failure. Therefore if the cortical bone is not very soft the diameter of the coronal region preferably can be as the diameter of the body of the implant or/and at least partially less then the body of the implant. The most coronal part of the coronal region can be at least partially inversed tapered 125 as illustrated in FIG. 13 or/and at least partially parallel with a diameter which is less than the diameter of the coronal region just below this most coronal part.

The combination of two threads with a large thread step and at least partially inversed tapered coronal region can function in a synergistic mode to facilitate the insertion. The thread of the implant can have a high step. The most common implants has thread step of about 0.6 mm. The present implant can have a thread step of 1.5-2.8 mm or about 2.0-2.5 mm. The implant can have double thread meaning two threads with different beginnings running along the implant. This configuration causes that for every point of one thread there is a thread at the opposite side of the implant at the same vertical level. The threads when are inserted into the bone are creating slots. The two high step threads create two opposite steep slots in the bone for every bone segment. These slots facilitate the insertion of the implant because the bone is easily expanded. The presence of two opposite steep slots in the bone that each one is created by a thread of more than 1.5 mm and even of 2.0-2.5 mm thread step allows this expansion since this is usually the width of the cortical bone. A regular thread of 0.6 rain will create almost horizontal slots in the bone resulting in crushing of the bone instead of expansion. Because of the slots the bone is not crushed but elastically expanded. The threads can begin at the wider area of the coronally tapered region so when this wider area reaches the bone the bone has already two points in the bone having between them approximately the diameter of this wide region so this wide region is pushing the bone at the other direction and the bone segments between the slots are displaced from each other and come back to their original location after the wide region is inserted more inside the bone. These bone segments between the slots can relapse to their original location because the coronal segment 125 is tapered coronally. This process will occur for every point along the bone where the coronally tapered region 125 is inserted inside the bone since this region is just above the beginning of the threads. The end result is a tapered region inside the bone covered with bone. If the two threads are not the same, as explained above, then on one side of the implant the first thread is compressing the bone and on the other side the second thread is cutting the bone. In this embodiment the elastic expansion of the bone is enhanced and the insertion and elastic relapse of the bone are more easily achieved. In some preferred embodiments the threads continue over the coronally tapered region. In this configuration the coronal region is not a circle in horizontal cross section but resembles more an ellipse since the double thread that extends along the coronally tapered region reduce its diameter in one direction. This configuration facilitates the insertion of the wide segment of the coronaly tapered coronal region inside the bone because the longer diameter of this ellipse is inserted to the slots in the bone. The insertion of a coronally tapered region with more than one thread on it allows elastic expansion of the bone and the bone is covering this tapered region after insertion inside the bone. The best results are achieved if the height of the intra-bony coronally tapered region is close to the thread step. In one preferred embodiment the height of the intra-bony coronaly tapered region is higher than a half of the thread step.

The coronal region can have several configurations. A coronally tapering coronal region (becoming wider coronally) or/and an inversed tapered coronal region or/and a parallel wall coronal region. In some embodiments of the novel implant the coronal region is not identical all around. The coronal region can have parallel walls (127 in FIG. 8, parallel to the long axis of the implant) at one aspect, for example its buccal and/or palatal aspects and inversed tapered coronal region 128 at a second aspect for example its mesial and distal aspects as illustrated in FIG. 8. With this configuration the implant is suitable for soft bone because of its parallel aspect and for dense bone because of its inversed tapered aspect. The dentist can decide where to position the parallel aspect and where to position the inversed tapered aspect. If the alveolar ridge is narrow it is recommended to position the inversed tapered region facing the buccal aspect and/or the palatal aspect. If the mesio-distal dimension is limited it is recommended to place the inversed tapered region facing the mesio aspect and/or distal aspect. When the width of the coronal edge is not identical all around the dentist can decide to position the wider aspect of the coronal edge towards the direction of the forces. For example if the implant is inserted in angulation to the plane of chewing the wider edge (for example the aspect with the parallel wall) is more recommended to be placed along the plane of the angulation. With this configuration a cross section of the coronal region perpendicular to the long axis of the implant is creating for example an elliptic outline instead of a round outline. The novel coronal region can have different tapering at different aspects of the coronal region. For example to have a parallel wall (parallel to the longitudinal axis of the implant) on one aspect, a coronally tapered region on another aspect and an inversed tapered region in another aspect of the coronal region. The distribution of different tapering around the coronal region can be different at different vertical heights along the coronal region. The coronal region can start with a strong tapering and than to change to a more moderate tapering.

In another preferred embodiment the threads can be along at least part of the coronally tapered region. The threads on the coronally tapered region can be the same as the threads along the implant but in another preferred embodiment can be smaller in the thread step and/or the thread horizontal length and or vertical height. The presence of a small thread or micro-thread in this region can allow better distribution of the forces to the cortical bone.

Figure 14A:
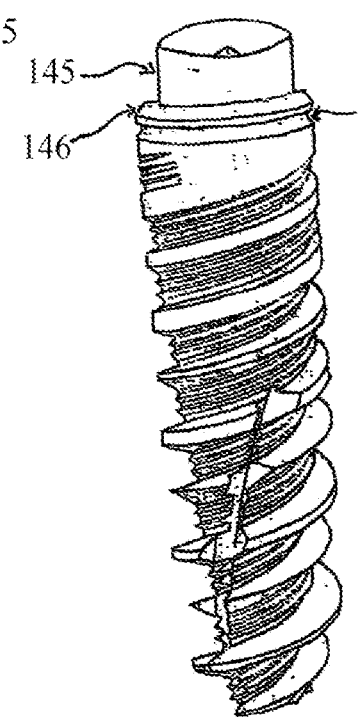
FIG. 14A is a side elevation view illustrating another embodiment of a dental implant with narrow parallel walls at the coronal region.

In another preferred embodiment illustrated in FIG. 14A the most coronal part 145 can be parallel with one diameter which can be smaller than the diameter of the coronal region 146 just below this most coronal part 145. The transition between the most coronal part 145 to the coronal region 146 just below the most coronal part can be sharp or/and rounded. In a preferred embodiment the narrower most coronal part 145 begins above a micro slot 147.

Figure 15:
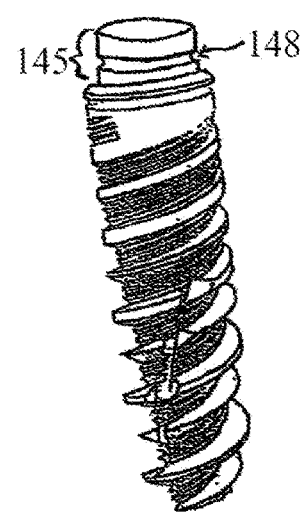
FIG. 15 is a side elevation view illustrating another embodiment of a dental implant with a narrow parallel walls coronal region having a circular micro-slot.

The most coronal part 145 can have also at least one micro slot 148 as illustrated in FIG. 15. A parallel walled narrow coronal part 145 as illustrated in FIG. 14A leaves more space for the bone compared to a continuous coronal region (5 in FIG. 1) which is wider. A parallel walled narrow coronal part 145 as illustrated in FIG. 14A leaves also more space for the bone compared to a coronally tapered coronal region 125 in FIG. 13, which is wider in its lower part 185. If there is more space for the bone the blood supply for the bone and the periosteal tissue in improved and therefore the risk of bone resorption is reduced.

Figure 14B:
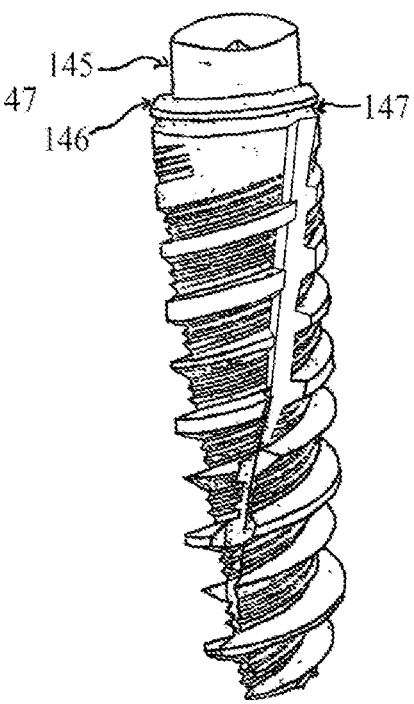
FIG. 14B is a side elevation view illustrating another embodiment of a dental implant with taps that extends to the coronal part.

The tap can extend to the coronal part as illustrated in FIG. 14B. FIG. 14B is only a representation to show the tap, and the general shape is not depicting the form of the dental implant.

The coronal region in most of the embodiments can have micro slots. These slots can be circular along the same horizontal plane or to be along several vertical heights in a wave form. In one preferred embodiment illustrated in FIG. 7 the coronal region can includes one or more micro circular slots 110 which are like rings and not threads. In this embodiment the bone implant connection is enhanced with circular fibers entering these slots.

The implant can include internal threads 130 for connection to the prosthetic part as illustrated in FIG. 6. The implant can include several sockets having a plurality of sides, e.g. a small hex 132 below a larger hex 133. The hexes can be aligned with their sides or not aligned to increase the options for the insertion of a prosthetic element. It is also possible to connect a prosthetic element 140 with a downwards tapering anti-rotational element 142 illustrated in FIGS. 6 and 6A. The downwards tapering anti-rotational element can have several sides for example an external hexagon to match the hexagon inside the implant. The downwards tapering anti-rotational element is touching the upper region of both hexes 132, 133 and therefore the rotation is prevented. This design allows the insertion of prosthetic elements directly inside angulated implant without the need for additional abutments. FIGS. 6 and 6A are illustrating the use of two hexes, but any combination of the number of sides can be used for example a hexagon and a 12 sides element or/and octagon above it etc.

Figure 16:
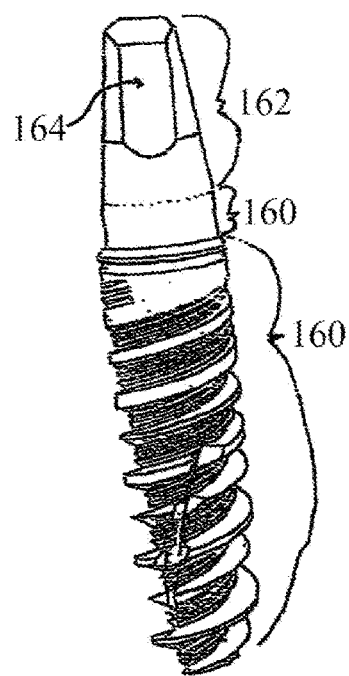
FIG. 16 is a side elevation view illustrating an embodiment of a one-piece dental implant.

In case the bone is very narrow the core can be also very narrow. When the core is very narrow it can't include internal threads, so the implant can come in one piece with an abutment. In these embodiments the coronal supragingival part serves for insertion of the implant and also as an abutment to support the future prosthetics. FIG. 16 illustrates such an embodiment with a narrow parallel region 160 between the part of the implant that is to be inside the bone 161 and the abutment part 162 which can be tapered to allow connection to a prosthetic element like a crown. The narrow region 160 allows good attachment of the gums to the implant therefore prevents bone loss. The narrow region can also be coronally tapered and/or can be inserted at least partially inside the bone. The abutment region 162 can include an internal anti-rotational element or external anti-rotational element 164 that will serve for the insertion of the implant. The abutment region 162 can include internal or/and external threads for the connection to other prosthetic components.

Figure 17:
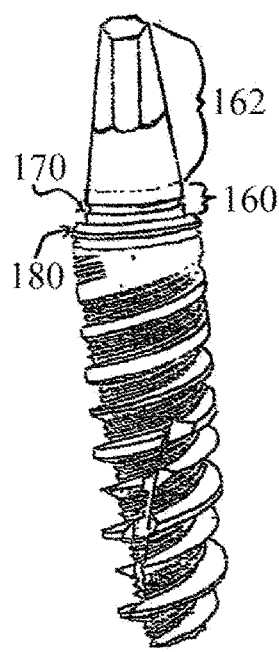
FIG. 17 is a side elevation view illustrating an embodiment of a one-piece dental implant having a circular micro-slot.

In another preferred embodiment illustrated in FIG. 17 the narrow region 160 below the tapered prosthetic region 162 can include a micro-slot 170. This slot can function for several purposes:

1) To enhance the attachment of the soft tissue if this region is above the bone since circular fibers from the gums will regenerate inside the slot 170.

2) To enhance the bone regeneration if this region is inserted inside the bone.

3) To allow the connection of a mount that will serve for the delivery of the implant. The mount can be elastic and to be connected in a "click" to the micro-slot. In one preferred embodiment the micro-slot 170 is up to 1 mm above the wide region 180 of the implant and it is inserted inside the bone or very close to the bone so this slot will be inside bone or/and the gums and will not interfere in the prosthetic procedure.

In some other preferred embodiment the implant can be made from more than one part. For example the apical part of the implant and the coronal part of the implant can be different components that can be attached to each other and/or detached from each other. The apical component can include some of the features described above, for example the tapered core, the double variable threads, the tapered apical region, and the condensing or/and the condensing taps etc. The separate coronal component can include also some of the features of the coronal region described above, for example to have micro-slots, to be inversed tapered, to have an anti-rotational socket or protrusion for the attachment of a prosthetic component etc. The connection between the two components can be by friction or/and screwing the coronal component inside the apical component or/and by a screw connecting the two components. In a preferred embodiment the two components are attached also with a sealing material to prevent the colonization of bacteria in the micro-gap between the components and the penetration of molecules or/and bacteria from the oral cavity inside the bone through the micro-gap between the coronal component to the apical component. In a preferred embodiment the coronal component is inversed tapered or narrow than the apical component so the connection and disconnection of the two components becomes easy and the connection line can be visualized by the dentist.

In operation, the implant can be placed into a pre-drilled osteotomy site that either matches the external diameter of the implant body, that is, the narrowest diameter between threads, or into a site that is narrower than the external diameter of the implant. Placing the implant into a narrower site will provide additional bone compression, and therefore greater initial stability. The design of the novel implant can induce bone expansion if the diameter of the drill is less than the diameter of the implant. The drill can be straight or tapered and the diameter is dictated by the density of the bone. For soft bone the last drill has small diameter and even insertion can be done without drilling. In dense bone a wider drill can be used and the spaces between the bone and the core of the implant will be filled with blood vessels while the implant is stabilized by the high threads.

In most of the preferred embodiments demonstrating an anti-rotational element on the implant there is also included a compatible anti-rotational element on the abutment. The number of the protrusions or slots or angles of the anti-rotational element don't have to be the same for the implant and the abutment as long as the abutment can be seated on the implant and rotation is prevented.

The implants of the present invention can be connected to any element which is protruding through the gums to the oral cavity. All the abutments and/or prosthetic elements described above can come in different heights, different widths and different angles and to be seated at different heights from the bone level. They also can have different heights and widths of the subgingival part and different heights and widths of the supragingival part. The prosthetic elements can include for example abutment for cementation or/and for crewed restorations in various lengths, angulations, morphologies and/or finishing lines. The prosthetic elements can include ball attachments, dolder-bars, crowns, bridges, various denture attachments and impression components.

All the embodiments of implants or/and abutments of the present invention can have several surfaces. The implant can have machine surface but can have rough surface like TiUnite, S.L.A, Osscotite, Hydroxyapatite or bioactive surface that has growth factors and active proteins like B.M.P. The rough surface can be along at least part of the intra-bony part of the implant and can be also extending to the narrow region 160 of the implants in FIGS. 16 and/or 17.

All the embodiments of implants or/acid abutments of the present invention can be made from any biocompatible material like titanium in its various grades, titanium alloy, zirconium and any polymeric material like the biocompatible polymers which are used in orthopedics for fixation, implants, and/or artificial joints.

In the embodiments of the present invention the implants can be supplied already connected to a mount or the mount is to be connected by the dentist.

As a result, some of the above embodiments provide unique advantages by providing a dental implant fixture which is suited for use in lower density bone, regular density bone and/or dense bone. In some of the embodiments the implant features a tapered profile and a unique external thread profile that offers superior stability when it is implanted in low density bone while insertion is easy. The implant tapers down in diameter optionally beginning at a point about 1-3 mm from below the top surface of the implant and/or tapering more at it apical region. The external thread can be also tapered and changing profile from the coronal to the apical ends of the implant fixture, having a sharp, narrow and high profile at the apical end, suited for cutting into non-tapped bone, and having a broad or/and rounded or/and low profile at the coronal end, suited for compression of bone tapped by the thread at the apical end. Further, the thread profile optionally has a flat shelf on its apical aspect, being most pronounced at the coronal end of the implant and being less pronounced at the apical end of the implant. At its coronal end, the implant has an optional flared region that acts as a mechanical stop, serving to limit over-insertion of the implant into soft bone or/and parallel walls or/and being inversed tapered. At its apical end, the implant optionally has a round, blunt shape and a set-back thread in the event the implant comes in advertent contact with non-osseous structures or can have blades to facilitate the cutting inside the bone. The implant can be of one piece and have coronally converging intra-bony region near the coronal cortical bone.

The implant can have a synergistic combination of a cutting tap with a condensing tap to facilitate the insertion in all bone types.

The combination of each couple of the aspect described above: the coronal region, the core, the threads, the taps and the apical region allows to produce an implant that is easily inserted although the drilling is minimal, to easily dictate the location of the implant, to allow good stabilization in the bone and to allow the bone to be above the intra-bony coronally tapered region. The presence of bone above this region supports the gums and maintains their desired configuration especially the height of the gums between the teeth called papilla, which are very important for the esthetic result. This bone is preserved since the implant allows drilling with a small diameter drill and the core is tapered and the threads are tapered with variable thread design and the coronal region can be inversed tapered or/and parallel narrow. The combination of all the features and the relationship between them can lead to an implant that allows the best esthetic result in all bone types.

Although illustrative embodiments have been shown and described, a wide range of modification change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A dental implant comprising:
a body having a coronal part and an apical part that are continuous with one another;
said apical part has a core and at least two main threads having a thread pitch of at least 1.5 mm extending along said core, said coronal part being located coronally to said at least two main threads, at least part of said coronal part being an intra-bony coronal part, an external surface of said intra-bony coronal part and an external surface of said apical part are both being rough surface configured to be in contact with bone,
said intra-bony coronal part has an internal cavity for receiving a dental abutment,
said apical part has a first tap and a second tap that both extend from an apical end of said apical part coronally while crossing said at least two main threads,
at least part of said first tap when viewed from a first elevation view perspective, in which said coronal part being above said apical part, has a right side of said first tap and a left side of said first tap that both extend from said external surface of said apical part towards the inside of said apical part,
at least part of said second tap when viewed from a second elevation view perspective, in which said coronal part being above said apical part, has a right side of said second tap and a left side of said second tap that both extend from said external surface of said apical part towards the inside of said apical part,
said right side of said first tap forms a right edge of said first tap with said external surface of said apical part,
said left side of said first tap forms a left edge of said first tap with said external surface of said apical part,
said right side of said second tap forms a right edge of said second tap with said external surface of said apical part,
said left side of said second tap forms a left edge of said second tap with said external surface of said apical part,
wherein said right edge of said first tap has a first region located at a first distance from an apex of said implant that has an angle of less than 90 degrees between said right side of said first tap forming said right edge of said first tap and said external surface of said apical part,
said right edge of said first tap has a second region located at a second distance from said apex that has an angle of more than 90 degrees between said right side of said first tap forming said right edge of said first tap and said external surface of said apical part,
said left edge of said second tap has a third region located at a third distance from said apex that has an angle of less than 90 degrees between said left side of said second tap forming said left edge of said second tap and said external surface of said apical part,
said left edge of said second tap has a fourth region located at a fourth distance from said apex that has an angle of more than 90 degrees between said left side of said second tap forming said left edge of said second tap and said external surface of said apical part.

2. The implant of claim 1, wherein said first tap and said second tap extend from said apical end of said apical part to said coronal part.

3. The implant of claim 1, wherein said sides of each said tap are connected through a rounded zone inside said tap.

4. The implant of claim 1, wherein at least part of said intra-bony coronal part has an external circular cylindrical shape which is parallel to a central longitudinal axis of said implant, said thread pitch of said at least two main threads is 2.0-2.5 or 2.8 mm, at least one of said at least two taps when viewed from an elevation view perspective, in which said coronal part being above said apical part, being tilted to the right as extending upwards to said coronal part.

5. The implant of claim 1, wherein said coronal part has a coronal region and a most coronal part, said most coronal part of said coronal part extends coronally from said coronal region of said coronal part to a coronal edge of said coronal part,
said most coronal part of said coronal part has a cylindrical segment with one external diameter, an external surface of said cylindrical segment of said most coronal part of said coronal part being part of said external surface of said intra-bony coronal part and being parallel to a central longitudinal axis of said implant,
said external diameter of said cylindrical segment of said most coronal part of said coronal part being smaller than an external diameter of said coronal region of said coronal part just apically to said most coronal part of said coronal part, said coronal region of said coronal part has at least one external slot,
said most coronal part of said coronal part being coronally to said at least one external slot,
said thread pitch of said at least two main threads is 2.0-2.5 or 2.8 mm.

6. The implant of claim 5, wherein said at least one external slot has a wave form.

7. The implant of claim 1, wherein a most coronal segment of said coronal part being tapered coronally forming a coronal edge of said coronal part so an external diameter of said coronal edge of said coronal part being smaller than a diameter of said coronal part just apically to said coronal edge of said coronal part, a diameter of said core adjacent said coronal part being larger than a diameter of said core adjacent said apical end of said apical part, at least along part of said first tap said left edge of said first tap has an angle of less than 90 degrees between said left side of said first tap forming said left edge of said first tap and said external surface of said apical part.

8. The implant of claim 1, wherein an overall external diameter of said coronal part being smaller than an overall external diameter of said body.

9. The implant of claim 1, wherein said implant being connected to a prosthetic element selected from the group consisting of: abutment for cementation, abutment for screwed restoration, temporary abutment, dolder-bar, ball-attachment, connector, locator, crown, bridge, impression coping, healing cap, and any combination thereof.

10. A dental implant comprising:
a body having a coronal part and an apical part that are continuous with one another;
at least part of said coronal part being an intra-bony coronal part, an external surface of said intra-bony coronal part and an external surface of said apical part are both being rough surface configured to be in contact with bone,
said intra-bony coronal part includes an internal cavity for receiving a dental abutment, said apical part has at least one tap that extends from an apical end of said apical part coronally and has two sides extending from said external surface of said apical part towards the inside of said apical part, at least one of said sides of said at least one tap forms an edge with said external surface of said apical part, wherein said edge of said at least one tap has a first region when viewed from a first cross-sectional perspective, which is perpendicular to a longitudinal axis of said implant and located at a first distance from an apex of said implant, has an angle of less than 90 degrees between said at least one of said sides of said at least one tap forming said edge and said external surface of said apical part, said edge of said at least one tap has a second region when viewed from a second cross-sectional perspective, which is perpendicular to said longitudinal axis and located at a second distance from said apex has an angle of more than 90 degrees between said at least one of said sides of said at least one tap forming said edge and said external surface of said apical part.

11. The implant of claim 10, wherein said apical part has a core and at least two main threads having a thread pitch of at least 1.5 mm extending along said core, said intra-bony coronal part extends coronally from said at least two main threads.

12. The implant of claim 11, wherein said apical part has a second tap that has two sides extending from said external surface of said apical part towards the inside of said apical part, each said side of said second tap forms an edge with said external surface of said apical part, wherein each said edge of said second tap has a region when viewed from a cross-sectional perspective has an angle of less than 90 degrees between said side of said second tap forming said edge of said second tap and said external surface of said apical part.

13. The implant of claim 11, wherein a coronal segment of said intra-bony coronal part has parallel external walls with one diameter, which is smaller than a diameter of said intra-bony coronal part apically to said coronal segment of said intra-bony coronal part, said coronal segment of said intra-bony coronal part extends coronally from a slot in said intra-bony coronal part, said thread pitch of said at least two main threads is 2.0-2.5 mm.

14. The implant of claim 11, wherein a most coronal segment of said coronal part being tapered coronally forming a coronal edge of said coronal part so an external diameter of said coronal edge of said coronal part being smaller than a diameter of said coronal part just apically to said coronal edge of said coronal part, a diameter of said core adjacent said coronal part being larger than a diameter of said core adjacent said apical end of said apical part, at a portion of said at least one tap both said two sides of said at least one tap have an angle of less than 90 degrees between said two sides of said at least one tap and said external surface of said apical part.

15. The implant of claim 10, wherein an overall diameter of said external surface of said intra-bony coronal part being smaller than an overall diameter of said body.

16. The implant of claim 10, wherein a most coronal region of said implant being tapered forming a narrower coronal edge.

17. The implant of claim 10, wherein said internal cavity of said intra-bony coronal part has a tapered socket becoming narrower apically, apically to said tapered socket of said internal cavity said implant has a first and second anti-circular sockets, an apical end of said first non-circular socket being apically to an apical end of said second non-circular socket, apically to said two non-circular sockets said implant has an internal thread, said dental abutment being connected to said implant, said dental abutment has a non-circular protrusion, said non-circular protrusion of said dental abutment engages at least part of said first non-circular socket and at least part of said second non-circular socket.

18. The implant of claim 10, wherein said implant being connected to a prosthetic element selected from the group consisting of: abutment for cementation, abutment for screwed restoration, temporary abutment, dolder-bar, ball-attachment, connector, locator, crown, bridge, impression coping, healing cap, and any combination thereof.

* * * * *